(12) United States Patent
Kosugi

(10) Patent No.: US 8,654,818 B2
(45) Date of Patent: Feb. 18, 2014

(54) TRANSMITTER DEVICE, RECEIVER DEVICE, AND COMMUNICATION SYSTEM

(75) Inventor: Masanori Kosugi, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 197 days.

(21) Appl. No.: 13/416,587

(22) Filed: Mar. 9, 2012

(65) Prior Publication Data

US 2012/0236951 A1  Sep. 20, 2012

(30) Foreign Application Priority Data

Mar. 15, 2011  (JP) .................................. 2011-056848

(51) Int. Cl.
*H04B 1/00* (2006.01)

(52) U.S. Cl.
USPC ........... 375/146; 375/295; 375/340; 370/300; 370/470; 370/509; 714/701; 714/746

(58) Field of Classification Search
USPC ......... 375/140, 146, 147, 260, 295, 316, 340, 375/219; 370/300, 319–321, 470, 471, 476, 370/506, 509–511; 714/701, 746, 747
See application file for complete search history.

(56) References Cited

U.S. PATENT DOCUMENTS

| | | | |
|---|---|---|---|
| 7,724,783 B2 * | 5/2010 | Shvodian et al. ............. | 370/515 |
| 2002/0089994 A1 * | 7/2002 | Leach et al. .................. | 370/412 |
| 2005/0025101 A1 * | 2/2005 | Paneth et al. ................. | 370/336 |
| 2009/0232038 A1 * | 9/2009 | Gonzalez-Velazquez .... | 370/311 |
| 2010/0309972 A1 * | 12/2010 | Kawauchi ............... | 375/240.01 |

FOREIGN PATENT DOCUMENTS

JP  2009-278597  11/2009

* cited by examiner

*Primary Examiner* — Dac Ha
(74) *Attorney, Agent, or Firm* — Greenblum & Bernstein, P.L.C.

(57) ABSTRACT

A transmitter device that repeatedly transmits an identical frame includes a circuitry that generates the frame and transmits the frame a plurality of times. The frame includes marking areas that divide the frame into a plurality of frame segments having different lengths. The marking area is formed in the frame by part of the frame and is distinguishable from other parts of the frame. The marking area does not change data content transmitted by the frame. The frame segments obtained from the identical frame that is repeatedly transmitted by the circuitry are combined to reconstruct a complete frame identical to the frame transmitted by the transmitter device.

17 Claims, 10 Drawing Sheets

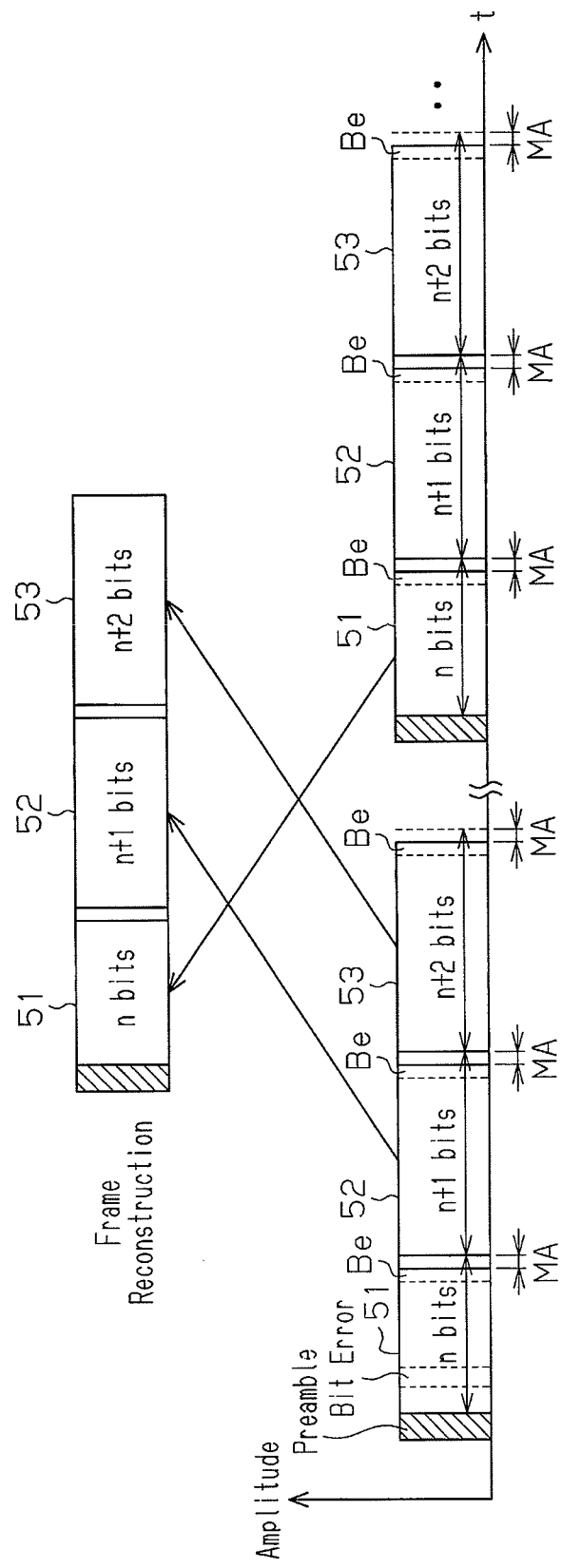

TRANSMITTER DEVICE, RECEIVER DEVICE, AND COMMUNICATION SYSTEM

CROSS-REFERENCE TO RELATED APPLICATIONS

This application is based upon and claims the benefit of priority from prior Japanese Patent Application No. 2011-056848, filed on Mar. 15, 2011, the entire contents of which are incorporated herein by reference.

BACKGROUND OF THE INVENTION

The present invention relates to a transmitter device, a receiver device, and a communication system.

In a wireless communication system, data is wirelessly transmitted from a transmitter to a receiver. The data includes of one or more frames. In certain situations, the receiver may fail to receive a frame normally. For example, the receiver may fail to receive a frame normally, or completely, when the frame data has a defect or when the receiver starts receiving data in the middle of a frame and thus misses the head of the frame. Japanese Laid-Open Patent Publication No. 2009-278597 describes a transmitter and a receiver that would overcome such a situation. The transmitter repeatedly transmits identical frames over a number of times. When the receiver fails to receive a frame normally, the receiver deletes the received frame and receives the subsequently transmitted identical frame.

In the above technique, the receiver that fails to receive a frame normally is required to wait until completely receiving the subsequently transmitted identical frame. However, the receiver may again fail to normally receive the subsequent frame. This may obstruct prompt communication of data including one or more frames.

SUMMARY OF THE INVENTION

It is an object of the present invention to provide a transmitter device, a receiver device, and a communication system that allow for further prompt communication.

A first aspect of the present invention is a transmitter device that repeatedly transmits an identical frame a plurality of times. The transmitter device includes a circuitry that generates the frame and transmits the frame a plurality of times. The frame is divided by a marking area into a plurality of frame segments having different lengths. The marking area is formed in the frame by part of the frame and is distinguishable from other parts of the frame. The marking area does not change data content transmitted by the frame. The frame segments obtained from the identical frame that is repeatedly transmitted by the circuitry are combined to reconstruct a complete frame identical to the frame transmitted by the transmitter device.

A second aspect of the present invention is a receiver device that includes a reception unit and a circuitry. The reception unit repeatedly receives a frame a plurality of times. The frame includes marking areas that divide the frame into a plurality of frame segments having different lengths. The circuitry detects the marking area from the received frame, identifies the plurality of frame segments based on an interval of the detected marking areas, and combines a plurality of normally received frame segments in the repeatedly received frames to reconstruct a complete frame identical to the frame transmitted by the transmitter device.

A third aspect of the present invention is a communication system that includes a transmitter device for repeatedly transmitting an identical frame a plurality of times; and a receiver device receiving the frame transmitted from the transmitter. The transmitter device includes a circuitry that transmits the frame. The frame includes marking areas that divide the frame into a plurality of frame segments having different lengths. The marking areas are formed in the frame by parts of the frame and are distinguishable from other parts of the frame. The marking areas do not change a data content transmitted by the frame. The plurality of transmissions of the identical frame includes transmission of a first frame received by the receiver device and a second frame received by the receiver device after the first frame. The receiver device identifies a plurality of frame segments in each of the first and second frames based on an interval between the marking areas, stores a frame segments in the first frame that is received normally, and combines a frame segment in the second frame that corresponds to a frame segment that has not been received normally in the first frame with the stored frame segment to reconstruct a complete frame identical to the frame transmitted from the transmitter device.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 3 is a timing chart showing the format of a frame and reconstruction of the frame;

DETAILED DESCRIPTION OF THE PREFERRED EMBODIMENTS

First Embodiment

A communication system according to a first embodiment of the present invention will now be described. The communication system includes a transmitter device and a receiver device. The communication system may be used, for example, as a tire pressure monitoring system (TPMS). The transmitter device may be a sensor unit 10 of the TPMS. The receiver device may be an in-vehicle device 20 of the TPMS.

Figure 1:
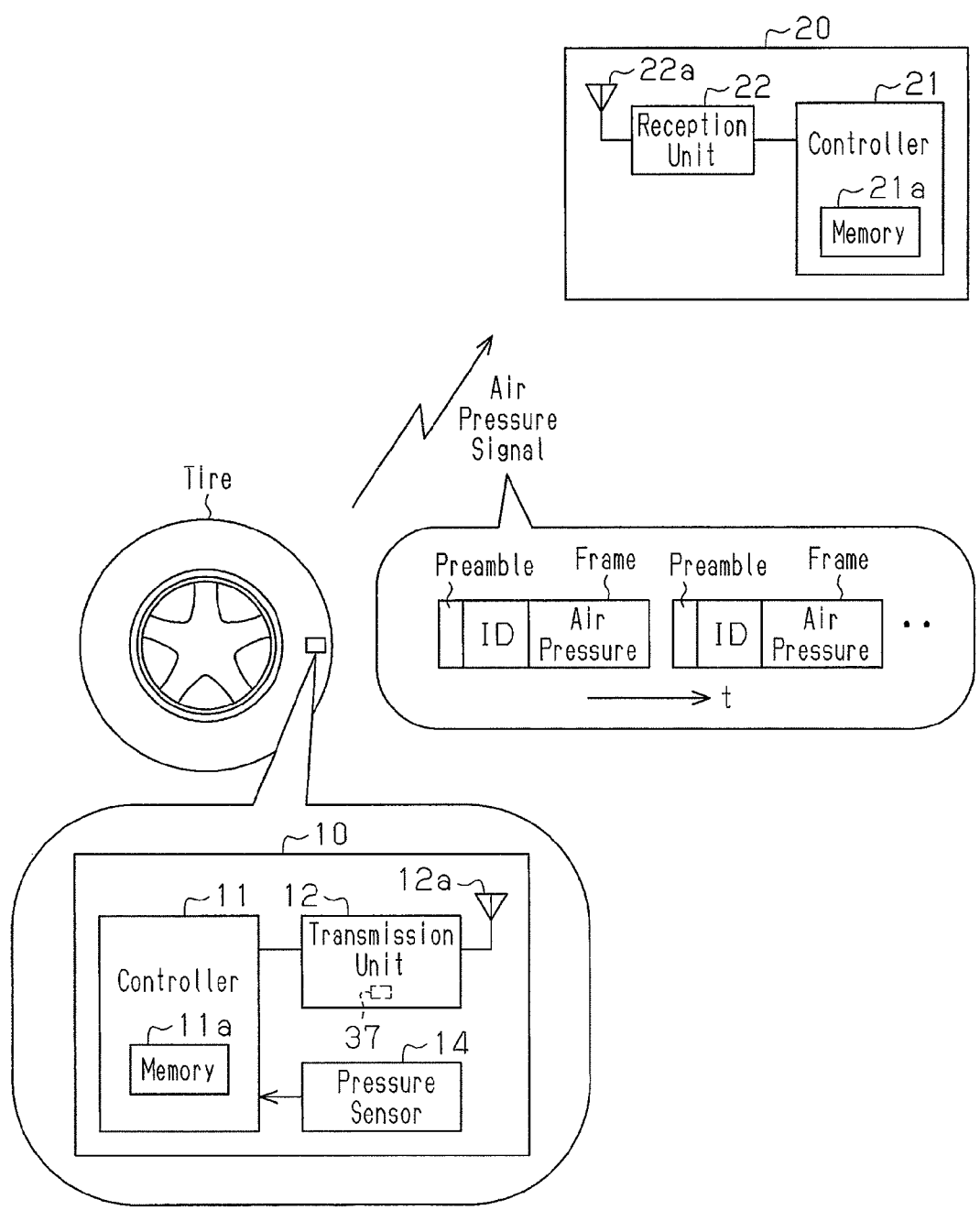
FIG. 1 is a block diagram of a communication system according to a first embodiment of the present invention.

As shown in FIG. 1, the sensor unit 10 is arranged in each tire of a vehicle. The sensor unit 10 intermittently transmits an air pressure signal indicating the air pressure of the corresponding tire to the in-vehicle device 20. FIG. 1 also shows the format of frames in an air pressure signal. The air pressure signal includes a plurality of (four, for example) identical frames. Each frame includes a preamble, an ID code, and an air pressure. The in-vehicle device 20 alerts a user when determining from a received air pressure signal that the air pressure of the tire has becomes less than or equal to a lower limit of a normal pressure range (which is also referred to as a pressure reference value).

Sensor Unit

As shown in FIG. 1, the sensor unit 10 includes a controller 11 (also referred to as a transmitter device controller), a transmission unit 12, a transmission antenna 12a, and a pressure sensor 14. The transmitter device controller 11 may include a nonvolatile memory 11a. The memory 11a stores an ID code unique to the sensor unit 10. The pressure sensor 14 detects the air pressure of the tire and transmits the detection result to the transmitter device controller 11.

The transmitter device controller 11 generates a frame including a preamble located at its head followed by the ID code of the sensor unit 10 and information indicating the air pressure detected by the pressure sensor 14. The frame may be formed by, for example, one hundred binary bits. The transmitter device controller 11 provides the generated frame to the transmission unit 12.

The transmission unit 12 modulates the frequency of its carrier wave in accordance with the logical bits of the frame. The carrier wave may be in an ultra high frequency (UHF) range. In the example shown in FIG. 2A, a carrier wave having a low frequency f1 corresponds to a logical bit 0 of the frame, and a carrier wave having a high frequency f2 corresponds to a logical bit 1 of the frame. The present example performs frequency shift keying (FSK) for modulation. The sensor unit 10 performs wireless communication to transmit a modulated signal, that is, an air pressure signal from the transmission antenna 12a.

Figure 2A:
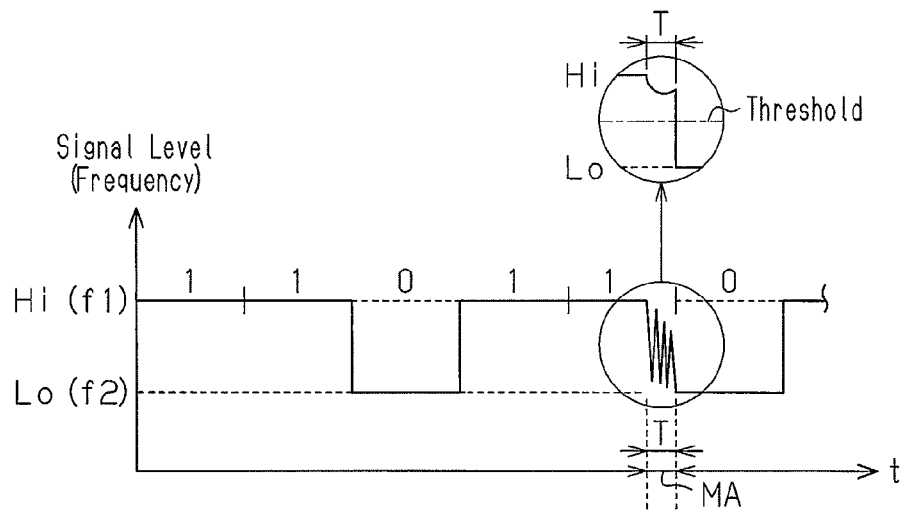
FIG. 2A is a waveform diagram showing the frequency and logical bits of a carrier wave carrying a frame.

The transmitter device controller 11 divides each frame into a plurality of frame segments (for example, three frame segments 51 to 53). Referring to FIGS. 2A and 3, the transmitter device controller 11 marks the frame at part of an nth bit (where n is a natural number) from the bit following the preamble. In the same manner, the transmitter device controller 11 marks the frame at part of an (n+1)th bit from the bit following the nth bit and then marks the frame at part of an (n+2)th bit from the bit following the (n+1)th bit. As will be described in detail later, in the example shown in FIG. 2A, the frame marking is performed by changing part of a bit so that the changed part can be distinguished from the other part of the bit as well as other bits. The changed part of a marked bit in the frame will hereafter be referred to as a marking area MA. In this manner, the frame is divided into the first to third frame segments 51 to 53 by the marking areas MA. The transmitter device controller 11 also adds an error detection bit Be to each of the frame segments 51 to 53.

Figure 2B:
FIG. 2B is a waveform diagram of a received signal.

The marking of the first embodiment will now be described. The circuitry (i.e., the controller 11 and/or the transmission unit 12) suspends a radio wave carrying an air pressure signal transmitted from the transmission antenna 12a for a fixed period T. As shown in FIG. 2B, this drastically decreases the strength of the air pressure signal (to zero, for example) during the fixed period T. The fixed period T is set to be short enough to keep the logic of the marked bit unchanged but long enough for the marking to be distinguished from noise. The fixed period T may be set, for example, to the time required to transmit 1/20 to 1/2 of a bit.

In-Vehicle Device

As shown in FIG. 1, the in-vehicle device 20 includes a controller 21 (also referred to as a receiver device controller), a reception unit 22, and a reception antenna 22a. The receiver device controller 21 may include a nonvolatile memory 21a. The memory 21a stores an ID code unique to the sensor unit 10.

Figure 4:
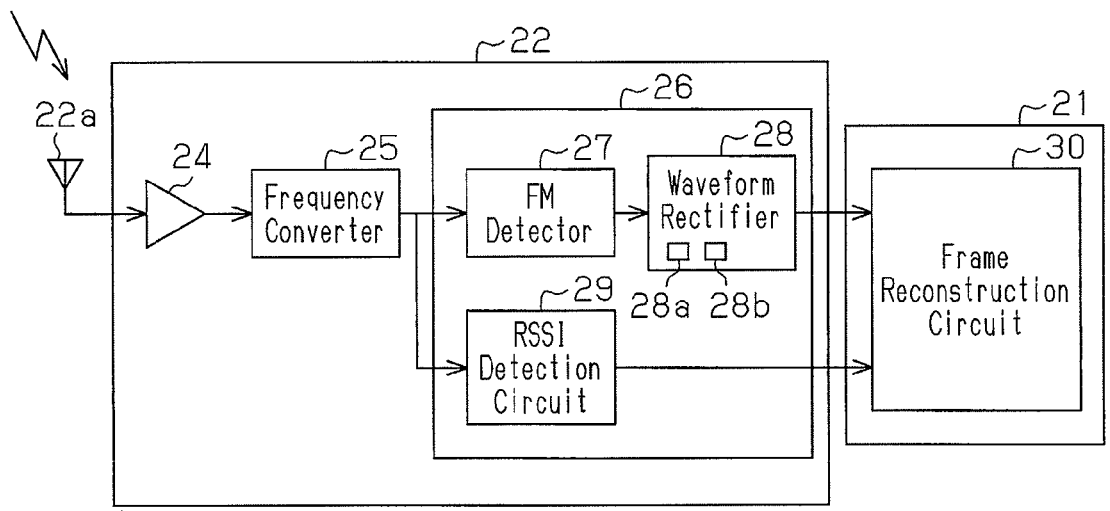
FIG. 4 is a block diagram of a receiver device in the first embodiment.

As shown in FIG. 4, the reception unit 22 includes an amplifier 24, a frequency converter 25, and a demodulator 26. The demodulator 26 is connected to a frame reconstruction unit 30, which is included in the receiver device controller 21.

The in-vehicle device 20 receives an air pressure signal with the reception antenna 22a. The amplifier 24 amplifies the received signal. The frequency converter 25 converts the frequency of the signal amplified by the amplifier 24 into a signal having an intermediate frequency and provides the signal to the demodulator 26.

The demodulator 26 includes a frequency modulation (FM) detector 27, a waveform rectifier 28, and a received signal strength indication (RSSI) detection circuit 29. Referring to FIG. 2A, the FM detector 27 generates a detection result signal at a low (L) level when the signal from the frequency converter 25 has a low frequency f1 corresponding to a bit value of 0. Further, the FM detector 27 generates a detection result signal at a high (H) level when the intermediate-frequency signal has a high frequency f2 corresponding to a bit value of 1. During the fixed period T, the frequency of the intermediate-frequency signal is neither frequency f1 nor f2. The detection result signal has an indefinite value area corresponding to the fixed period T in which the signal level (for example, the voltage) is indefinite. The FM detector 27 provides the generated detection result signal to the waveform rectifier 28.

Figure 2C:
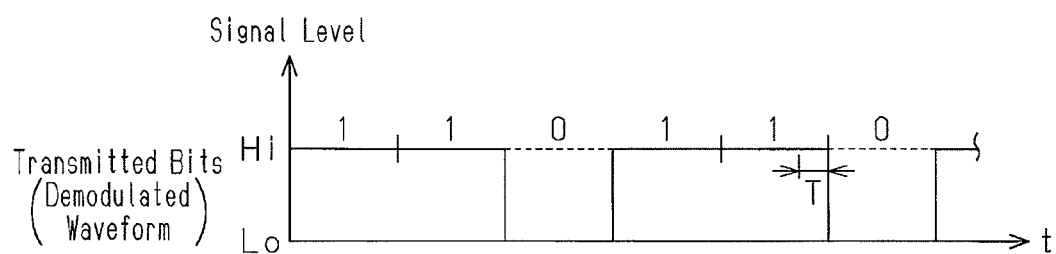
FIG. 2C is a waveform diagram showing the signal level of a transmission signal and of a demodulated signal.

The waveform rectifier 28 rectifies the waveform of the detection result signal from the FM detector 27 as shown in FIG. 2C and provides the rectified signal to the frame reconstruction unit 30. More specifically, the waveform rectifier 28 removes the indefinite value area of the detection result signal corresponding to the fixed period T. Referring to FIG. 4, the waveform rectifier 28 includes a low-pass filter 28a and a comparator 28b. The low-pass filter 28a removes high-frequency elements from the indefinite value area shown in FIG. 2A to generate a filtered signal and provides the filtered signal to the comparator 28b. The comparator 28b has a threshold (also referred to as a logical determination reference value), which is set at a value between the H level and the L level as shown in FIG. 2A. The comparator 28b outputs an H level signal when the signal level of the filtered signal is greater than or equal to the threshold, and outputs an L level signal when the signal level of the filtered signal is less than the threshold. The fixed period T is set to be short enough to prevent the level of the signal corresponding to the fixed period T from becoming less than the threshold after removal of the high-frequency elements.

The fixed period T used by the transmitter device and the receiver device may be set to be relatively long (for example, the time required to transmit ½ of a bit). When detecting the marking area MA (fixed period T), the receiver device may complement the signal level of the part corresponding to the marking area MA may be complemented by maintaining (copying) the status (0 or 1) of the signal immediately before the fixed period T. This allows for the receiver device to correctly reconstruct the marked bit and transmit the bit in the same manner as other bits.

Referring to FIG. 4, the RSSI detection circuit 29 detects the received signal strength indication (RSSI) of a signal from the frequency converter 25 and provides the detection result to the frame reconstruction unit 30. Referring to FIG. 2B, during the fixed period T, the RSSI detection circuit 29 receives a signal of which signal strength is approximated to zero. During other periods, the RSSI detection circuit 29 receives a signal having constant signal strength. The frame reconstruction unit 30 recognizes the fixed period T, or the marking area MA, by detecting the period during which the signal strength is maintained at substantially zero from the detection result of the RSSI detection circuit 29. Noise may instantaneously change the strength of a received signal. The frame reconstruction unit 30 determines that the signal strength is zero when detecting an extremely low signal strength that is not completely zero. The frame reconstruction unit 30 then counts the number of bits from the preamble or the first marking area MA that it acknowledges to the next marking area MA. The frame reconstruction unit 30 determines that the received frame segment is the first frame segment 51 when the counted number of bits is n, the second frame segment 52 when the counted number of bits is n+1, and the third frame segment 53 when the counted number of bits is n+2. The memory 21a may store, for example, a table showing the correspondence between the frame segments 51 to 53 and the number of bits between the marking areas MA. The frame reconstruction unit 30 then identifies the frame segments by accessing the table stored in the memory 21a. The counted number of bits may also be referred to as the interval between the marking areas.

In the example shown in FIG. 3, an identical frame is repeatedly transmitted. In this example, the frame that is first transmitted includes a bit error in its first frame segment 51. The receiver device controller 21 performs parity check or cyclical redundancy check to detect bit errors. Each of the frame segments 51 to 53 includes an error detection bit Be. The error detection bit Be allows the receiver device controller 21 to identify which ones of the frame segments 51 to 53 include bit errors.

When the first frame segment 51 of the received frame includes a bit error, the frame reconstruction unit 30 deletes the first frame segment 51 and temporarily stores the other frame segments that are do not include any bit error, namely, the second frame segment 52 and the third frame segment 53, in the memory 21a. When the first frame segment 51 of a second frame is completely received, that is, when the first marking area MA of the second frame transmitted is detected, the frame reconstruction unit 30 reconstructs the frame by combining the first frame segment 51 of the second frame with the previously received second and third frame segments 52 and 53 and stores the reconstructed frame in the memory 21a. Such a combination of frame segments includes a rearrangement of the first to third frame segments 51 to 53 as shown by the arrows in FIG. 3. In this manner, when the previously received frame includes a bit error in the first frame segment 51, the receiver device controller 21 (in-vehicle device 20) can reconstruct and acknowledge a complete frame without waiting until receiving an entire second frame. This shortens the time required to acknowledge a frame. The same applies to communication performed when the in-vehicle device 20 starts receiving data from the middle of the first frame segment 51.

Figure 5:
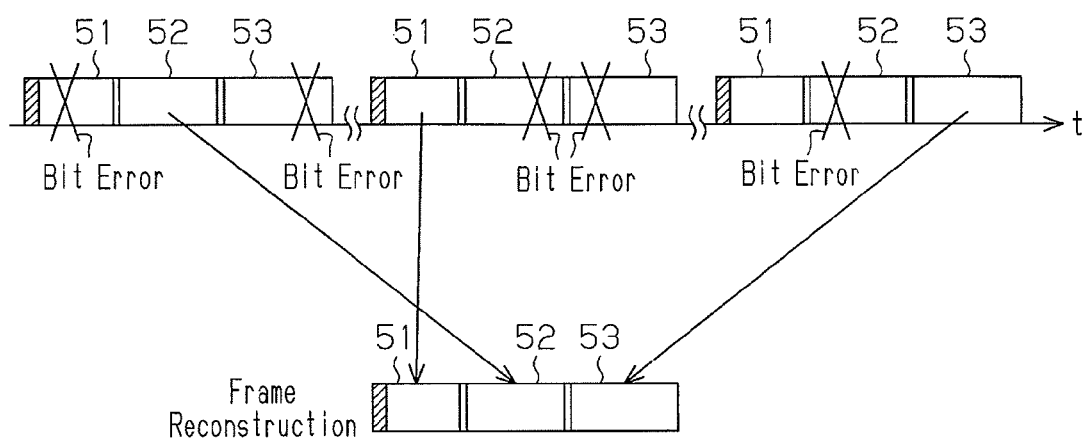
FIG. 5 illustrates a process with which the receiver device of the first embodiment reconstructs a frame.

FIG. 5 shows an example of a frame reconstruction performed under a poor signal reception environment in which many bit errors are included in the frame data. In this example, a first frame includes a bit error in the first frame segment 51 and also in the third frame segment 53. A second frame includes a bit error in the second frame segment 52 and also in the third frame segment 53. A third frame includes a bit error in the second frame segment 52.

In this case, the first frame segment 51 from the second frame, the second frame segment 52 from the first frame, and the third frame segment 53 from the third frame can be obtained as shown by the arrows shown in FIG. 5. The in-vehicle device 20 selectively combines frame segments that are free from bit errors as described above and thereby promptly reconstructs a frame that is free from bit errors even in a poor signal reception environment. In contrast, the prior art technique would require frames to be repeatedly transmitted until an entire single frame is received normally.

Upon acknowledgement of the frame, the receiver device controller 21 compares the ID code in the frame with the ID code in the memory 21a to identify the tire from which information has been transmitted. The receiver device controller 21 alerts a user when determining that the air pressure of the identified tire has becomes less than or equal to the lower limit value of the normal pressure range. For example, the receiver device controller 21 may activate an indicator (not shown) to notify the user that the air pressure of the identified tire is abnormal.

When the receiver device controller 21 (the in-vehicle device 20) cannot receive a normal marking of a frame, the receiver device controller 21 determines whether the frame is normal by performing parity check or the like. When determining that the frame is normal, the receiver device controller 21 acknowledges the frame irrespective of the marking. This operation is possible because the receiver device controller 21 can acknowledge a bit string of a frame even when a marking cannot be normally received. This prevents the receiver device controller 21 from deleting a frame just because a marking cannot be normally received.

The first embodiment has the advantages described below.

(1) The transmitter device (sensor unit 10) marks a frame to divide the frame into a plurality of frame segment. When the receiver device (in-vehicle device 20) normally receives one part of a frame and does not normally receive another part of the frame, the receiver device combines a normally received frame segment of the previously received frame and a normally received frame segment of a subsequently received frame to reconstruct a complete frame. This allows the receiver device to acknowledge a complete frame without waiting until entirely receiving a subsequently frame. As a result, the communication system allows for further prompt communication. For example, the receiver device (in-vehicle device 20) stores frame segments that have been received normally. During the reception of a subsequent frame, at the point of time the receiver device completely receives a frame segment that was not received with the previous frame, the in-vehicle device 20 reconstructs a complete frame by combining the received frame segment and the previously received frame segments stored in the memory.

(2) Even under a poor signal reception environment, the in-vehicle device 20 can reconstruct a complete frame by selectively obtaining normally received frame segments from repeatedly transmitted frames. This allows the communication system to complete communication between the sensor unit 10 and the in-vehicle device 20 further promptly in a further reliable manner.

(3) The sensor unit 10 suspends the radio wave carrying a frame during the fixed period T in correspondence with the marking area MA. This easily forms a marking area MA in a transmitted frame. The receiver device (in-vehicle device 20) detects a marking area MA by detecting an indefinite value area in which the signal level is indefinite during the fixed period T. After the marking area MA is detected, the corresponding indefinite value area is removed during the rectification performed by the waveform rectifier 28. For example, the waveform rectifier 28 rectifies the signal level corresponding to the indefinite value area to a signal level corresponding to the timing immediately before the fixed period T. This allows for a marked bit to include information in the same manner as other bits. The marking thus does not waste any bits.

Second Embodiment

A second embodiment of the present invention will now be described with reference to FIGS. 6 and 7A and 7B. The second embodiment differs from the first embodiment in that the marking is achieved through frequency shifting. The second embodiment will now be described focusing on the differences from the first embodiment.

Figure 6:
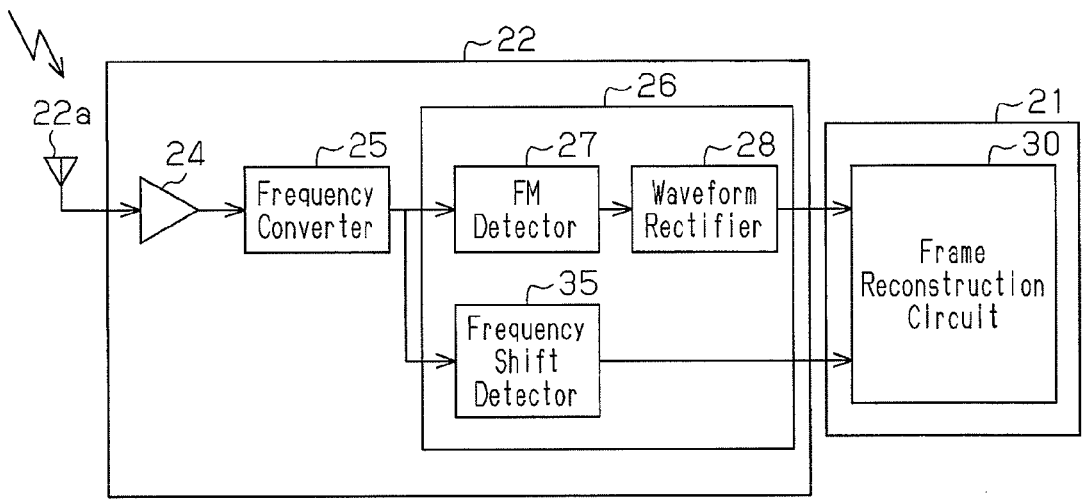
FIG. 6 is a block diagram of a receiver device according to a second embodiment of the present invention.
Figure 7A:
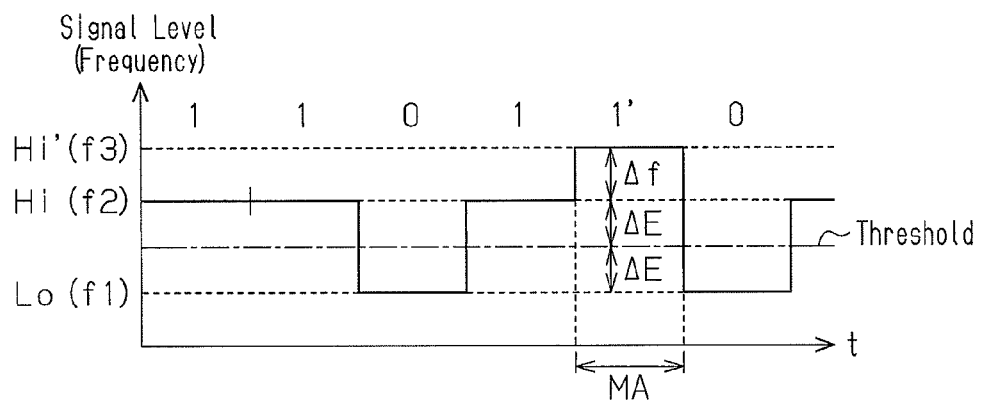
FIG. 7A is a waveform diagram showing the frequency and logical bits of a carrier wave carrying a frame.
Figure 7B:
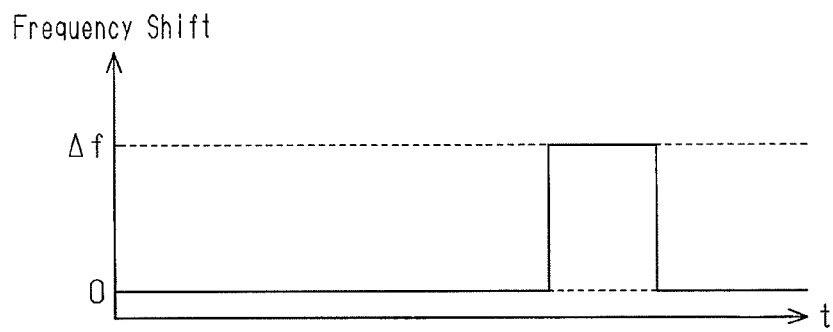
FIG. 7B is a waveform diagram of a detection signal generated by a frequency shift detector.

As shown in FIG. 6, the reception unit 22 includes a frequency shift detector 35 instead of the RSSI detection circuit 29 of the first embodiment.

When modulating the frequency of the carrier wave, the transmission unit 12 modulates the logical bit 0 of the frame to frequency f1, the logical bit 1 of the frame to frequency f2, and modulates a specific bit (a bit forming a marking area MA) to frequency f3. The frequency f3 is set to be higher than the frequencies f1 and f2. In the present example, each marking area MA dividing the frame into the first to third frame segments 51 to 53 is formed by a specific bit. The sensor unit 10 wirelessly transmits such a modulated signal, namely, an air pressure signal, to the transmission antenna 12a.

The air pressure signal received by the in-vehicle device 20 is processed by the amplifier 24 and the frequency converter 25 and then provided to the FM detector 27 and the frequency shift detector 35. As shown in FIG. 7A, the FM detector 27 generates a detection result signal at an L level when the signal provided from the frequency converter 25 has the frequency f1 corresponding to "0", generates a detection result signal at an H level when the signal has the frequency f2 corresponding to "1", and generates a detection result signal at a H' level when the signal has the frequency f3 corresponding to "1'". The waveform rectifier 28 has a threshold set at a value between the L level and the H level. The waveform rectifier 28 outputs a value rectified to the H level when its input value is greater than or equal to the threshold, and outputs a value rectified to the L level when its input value is less than the threshold. Through this processing, an H' level signal is converted to an H level signal. As a result, the received air pressure signal is demodulated to a binary signal including a logical bit 0 and logical bit 1 as shown in FIG. 2C. Accordingly, a marked bit can also carry transmission information.

The frequency shift detector 35 detects the bit that has been shifted to frequency f3 in the signal provided from the frequency converter 25. As shown in FIG. 7A, Δf represents the difference between the frequencies f2 and f3, and ΔE represents ½ the difference between the frequencies f1 and f2. Referring to FIG. 7B, the frequency shift detector 35 detects a frequency shift exceeding the difference ΔE, that is, a frequency shift within a range between the frequencies f2 and f3, and provides the detection result to the frame reconstruction unit 30. Based on the detection result from the frequency shift detector 35, the frame reconstruction unit 30 determines whether the frequency has been shifted more than the difference ΔE and reached the frequency f3. When determining that the shifted frequency has reached the frequency f3, the frame reconstruction unit 30 acknowledges the corresponding area as the marking area MA. The frame reconstruction unit 30 identifies the first to third frame segments 51 to 53 based on the number of counted bits from the preamble or a marking area MA to reconstruct a frame in the same manner as described in the first embodiment.

When shifting the frequency to frequency f3, the bandwidth occupied by the signal slightly increases. However, this subtly affects communication.

The second embodiment has the following advantage.

(4) The sensor unit 10 marks the frame by modulating the frequency of the carrier wave in correspondence with marking areas to a frequency differing from the frequencies corresponding to the logical values of 0 and 1. Accordingly, a marking can be formed by a relatively simple frequency modulation. For example, the sensor unit 10 divides the frame into the first to third frame segments 51 to 53 by shifting the frequency of the carrier wave to frequency f3, which differs from frequencies f1 and f2 corresponding to the logical values of 0 and 1. This allows the in-vehicle device 20 to identify frame segments and reconstruct a complete frame. Accordingly, the second embodiment has the same advantages as the first embodiment.

Third Embodiment

A third embodiment of the present invention will now be described with reference to FIGS. 8, 9A, and 9B. The third embodiment differs from the first embodiment in that markings are formed by changing phases. The third embodiment will now be described focusing on differences from the first embodiment.

Figure 8:
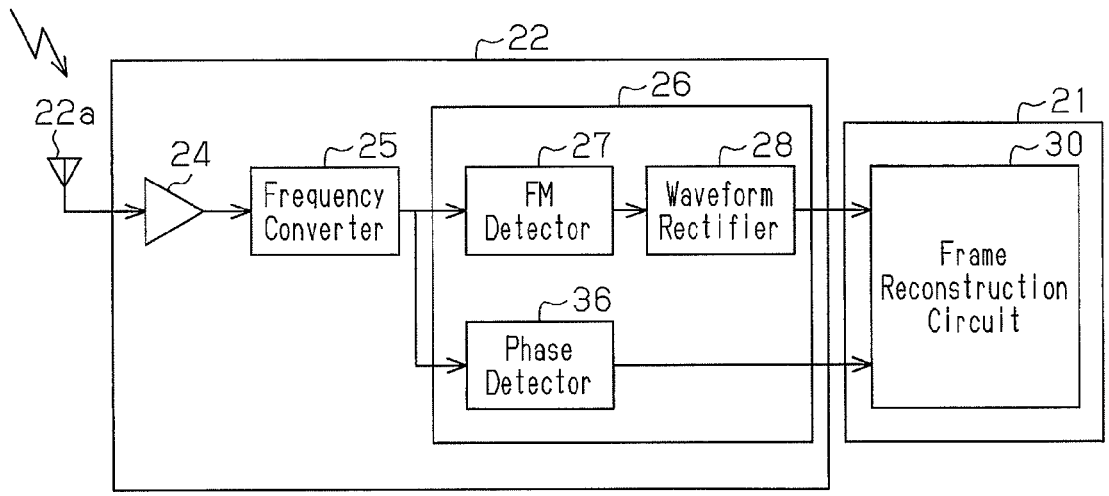
FIG. 8 is a block diagram of a receiver device according to a third embodiment of the present invention.
Figure 9A:
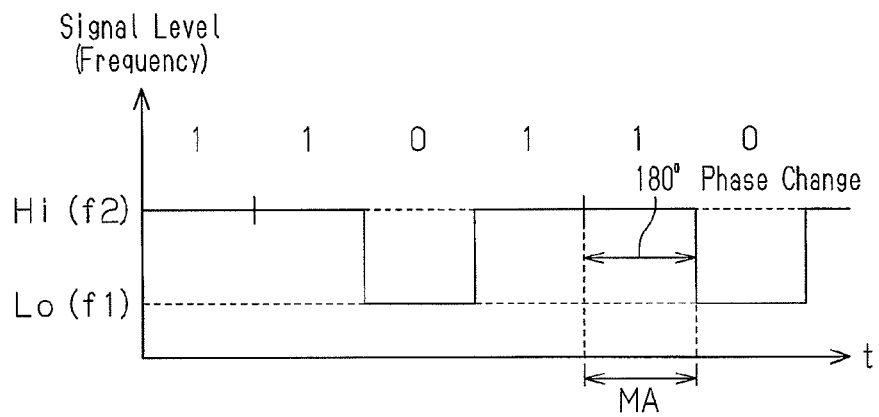
FIG. 9A is a waveform diagram showing the frequency and logical bits of a carrier wave carrying a frame.

As shown in FIG. 8, the reception unit 22 in the third embodiment includes a phase detector 36 instead of the RSSI detection circuit 29 of the first embodiment.

As indicated by broken lines in FIG. 1, the transmission unit 12 includes a phase shifter 37.

When modulating the frequency of the carrier wave, the phase shifter 37 of the transmission unit 12 shifts the phase of only specific bits (bits including marking area MA) by 180 degrees from the phase of a reference phase. The reference phase is the phase of the carrier wave. In the present example, the phases of specific bits are shifted to form the marking areas MA that divide the frame into the first to third frame segments 51 to 53.

The air pressure signal received by the in-vehicle device 20 is processed by the amplifier 24 and the frequency converter 25 and then provided to the FM detector 27 and the phase detector 36. As shown in FIG. 9A, the FM detector 27 generates a detection result signal having an L level when the signal from the frequency converter 25 has a frequency f1 corresponding to a bit value of 0. Further, the FM detector 27 generates a detection result signal having an H level when the signal has a frequency f2 corresponding to a bit value of 1. The FM detector 27 provides the wave detection result signal to the frame reconstruction unit 30. In this manner, the FM detector 27 generates the detection result in accordance with frequency. The detection result of the FM detector 27 is thus unaffected by phase shifts.

Figure 9B:
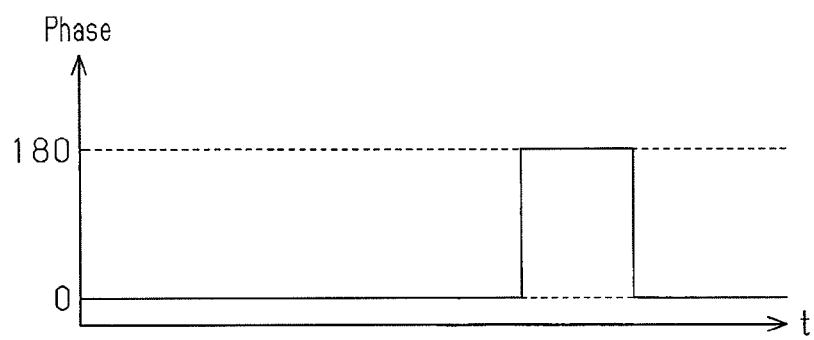
FIG. 9B is a waveform diagram of a detection signal generated by a phase detector.

Referring to FIG. 9B, the phase detector 36 detects a bit of which phase has been shifted by 180 degrees from the reference phase and provides the detection result to the frame reconstruction unit 30. Based on the detection result provided from the phase detector 36, the frame reconstruction unit 30 acknowledges specific bits of which phases are shifted by 180 degrees from the reference phase. That is, the frame reconstruction unit 30 acknowledges marking areas MA. The frame reconstruction unit 30 identifies the first to third frame segments 51 to 53 based on the counted number of bits from the preamble or a marking areas MA to reconstruct a frame in the same manner as in the first embodiment.

The third embodiment has the following advantage in addition to the advantages of the first embodiment.

(5) The sensor unit 10 marks the frame by shifting the phase of the carrier wave in correspondence with marking areas from the phase of other parts of the carrier wave.

Such relatively simple phase shifting forms markings. For example, the sensor unit 10 marks a frame by changing phases of specific bits in a signal to divide a frame into a plurality of frame segments. This allows the in-vehicle device 20 to identify frame segments and reconstruct a complete frame. Accordingly, the third embodiment has the same advantages as the first embodiment.

Fourth Embodiment

A fourth embodiment of the present invention will now be described with reference to FIGS. 10, 11A, and 11B. The fourth embodiment differs from the first embodiment in that markings are formed by inserting long pulses. The fourth embodiment will now be described focusing on differences from the first embodiment.

Figure 10:
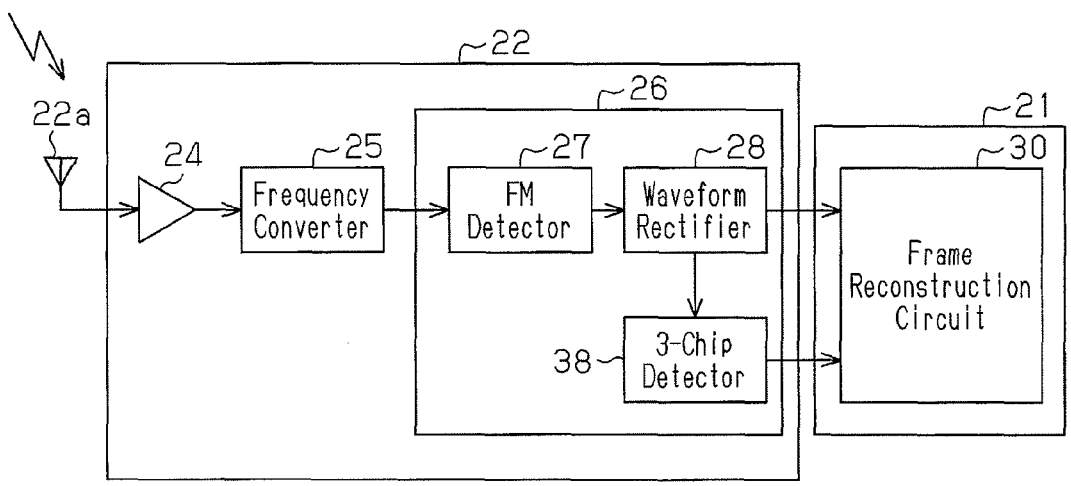
FIG. 10 is a block diagram of a receiver device according to a fourth embodiment of the present invention.

As shown in FIG. 10, the reception unit 22 in the fourth embodiment includes a three-chip detector 38 instead of the RSSI detection circuit 29 of the first embodiment. In the present embodiment, one bit may be referred to as two chips. The three-chip detector 38 is connected between the waveform rectifier 28 and the frame reconstruction unit 30.

In the present embodiment, the sensor unit 10 and the in-vehicle device 20 communicate with each other using Manchester code. Manchester code is a data transmission process in which changes in a signal level from the H level and the L level are signified by codes of 0 and 1. More specifically, 0 signifies a change from L to H, and 1 signifies a change from H to L.

The transmitter device controller 11 generates an air pressure signal (a frame) using Manchester code. The transmission unit 12 performs FSK modulation on the air pressure signal from the transmitter device controller 11 and transmits the modulated signal from the transmission antenna 12a.

In the present example, markings (marking areas MA) are added to a frame by inserting H level pulses corresponding to three chips (1.5 bit) at specific positions in the frame. The marking areas divide the frame into the first to third frame segments 51 to 53.

The air pressure signal received by the reception antenna 22a is processed by the amplifier 24 and the frequency converter 25 and then provided to the FM detector 27. As shown in FIG. 11A, the FM detector 27 generates a detection result signal having an L level when the signal from the frequency converter 25 has a frequency f1 corresponding to a bit value of 0. Further, the FM detector 27 generates a detection result signal having an H level when the signal has a frequency f2 corresponding to a bit value of 1. The FM detector 27 provides the wave detection result signal to the waveform rectifier 28. The waveform rectifier 28 rectifies the waveform of the detection result signal and provides the rectified signal to the frame reconstruction unit 30 and the three-chip detector 38.

The three-chip detector 38 detects the number of chips of which signal level has an H level. When detecting an H level signal for three consecutive chips as shown in FIG. 11B, the three-chip detector 38 provides a pulse, or detection result, to the frame reconstruction unit 30.

Based on the detection result from the three-chip detector 38, the frame reconstruction unit 30 acknowledges the area in which the signal has an H level for three consecutive chips. In other words, the frame reconstruction unit 30 recognizes the marking area MA. The frame reconstruction unit 30 identifies the first to third frame segments 51 to 53 based on the counted number of bits from the preamble or a marking area MA to reconstruct the frame in the same manner as described in the first embodiment.

Figure 11A:
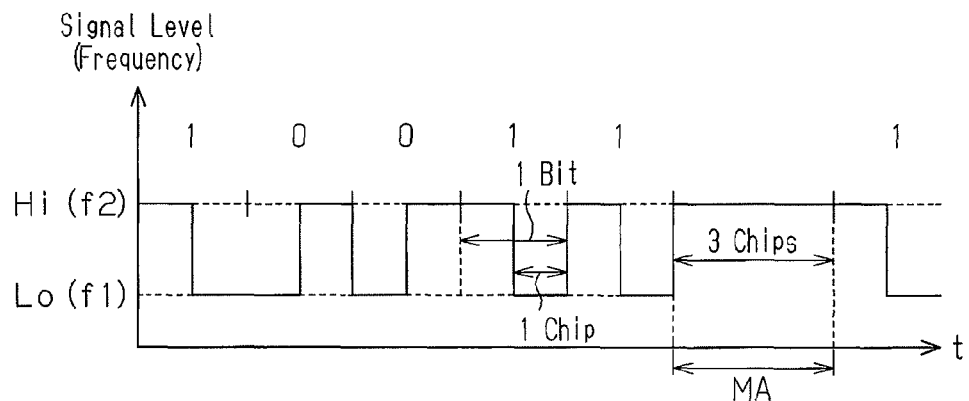
FIG. 11A is a waveform diagram showing the frequency and logical bits of a carrier wave carrying a frame.
Figure 11B:
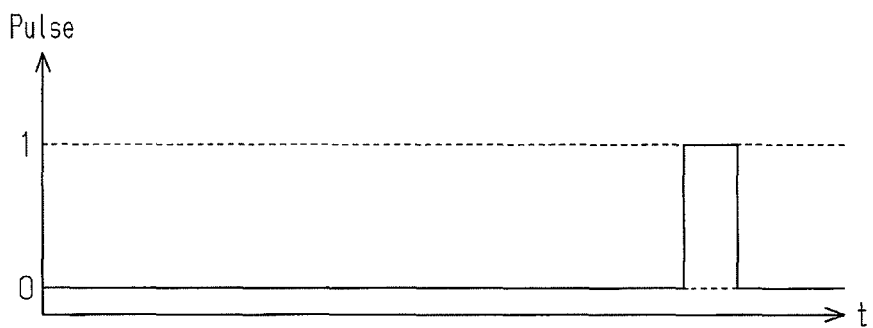
FIG. 11B is a waveform diagram of a detection signal generated by a three-chip detector.

As shown in FIG. 11A, each bit of the signal that has undergone Manchester encoding includes a shifted signal level or frequency. A normal signal that has undergone Manchester encoding would not include an area in which the signal has an H level for three consecutive chips. Based on this fact, an inserted marking is specified when detecting a signal area in which the same signal level or frequency is detected for three consecutive chips. In the present embodiment, an area including three consecutive H level chips is an example of a bit sequence that is not generated by a predetermined encoding process.

When a normal marking area cannot be received, the receiver device (the frame reconstruction unit 30) does not detect an area in which the signal has an H level for three consecutive chips in the present example. In this case, the frame received by the receiver device includes an erroneous bit value of 0 or 1. In the present embodiment, the receiver device deletes the frame when a normal marking area cannot be received.

The fourth embodiment has the following advantage in addition to the advantages of the first embodiment.

(6) The sensor unit 10 marks the frame by inserting a bit sequence that is not generated by encoding performed using a predetermined process (an H level pulse corresponding to three chips) into the frame. Such marking enabled by inserting the bit sequence does not change the amplitude, phase, and frequency of the signal. This simplifies the structure of the sensor unit 10 that enables marking.

Fifth Embodiment

A fifth embodiment of the present invention will now be described with reference to FIGS. 12, 13A, and 13B. The communication system of the fifth embodiment is applied to an electronic key system.

Figure 12:
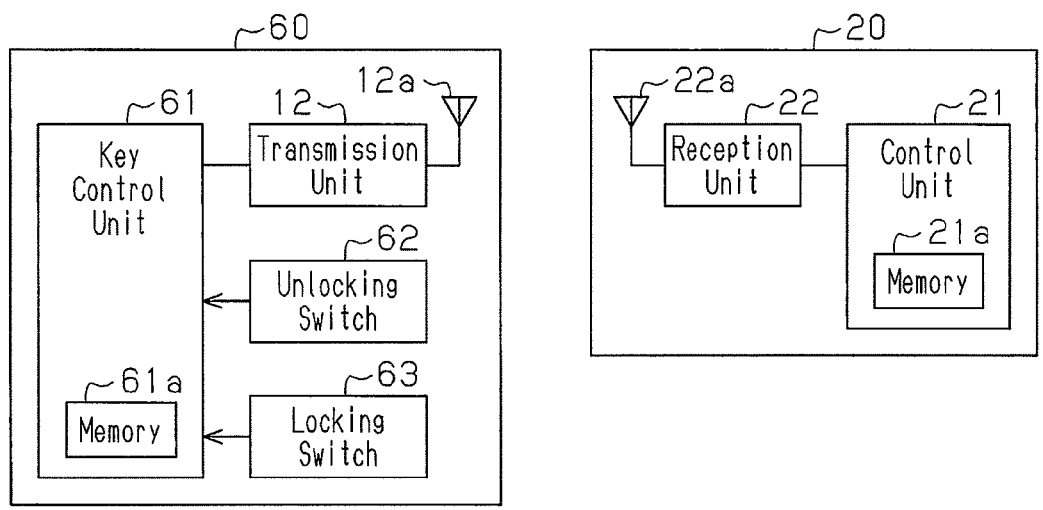
FIG. 12 is a block diagram of a communication system according to a fifth embodiment of the present invention.
Figure 13A:
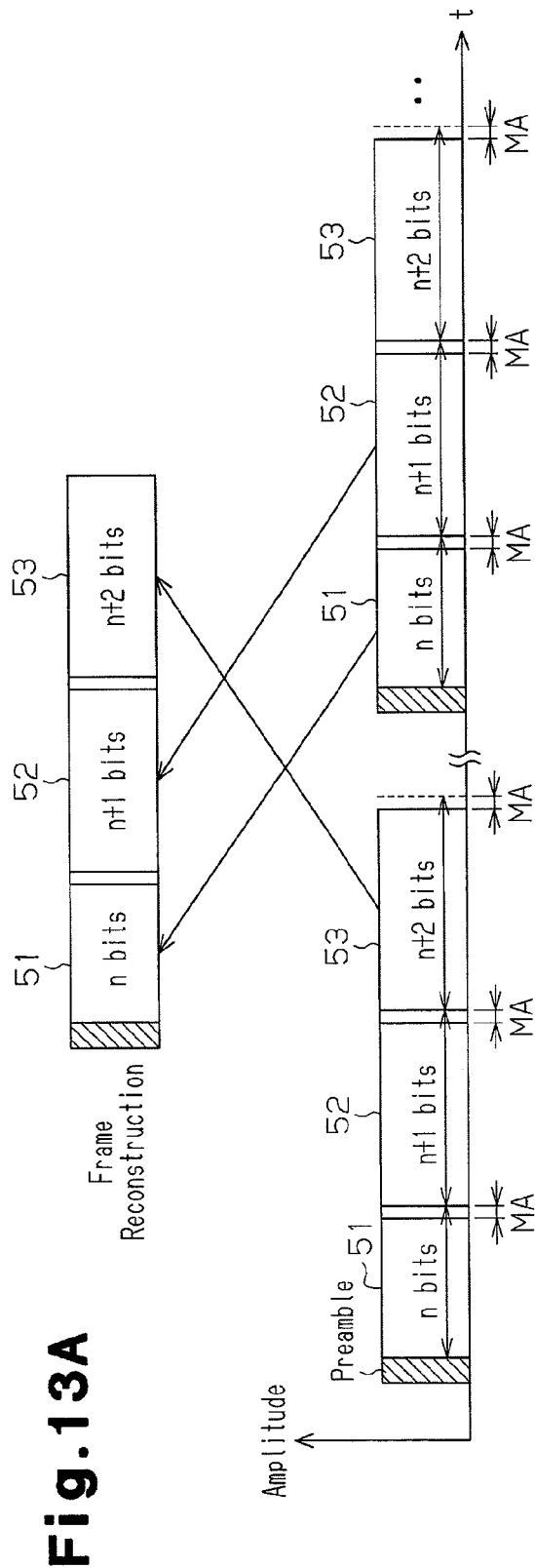
FIG. 13A is a timing chart showing the format of a frame and reconstruction of the frame.
Figure 13B:
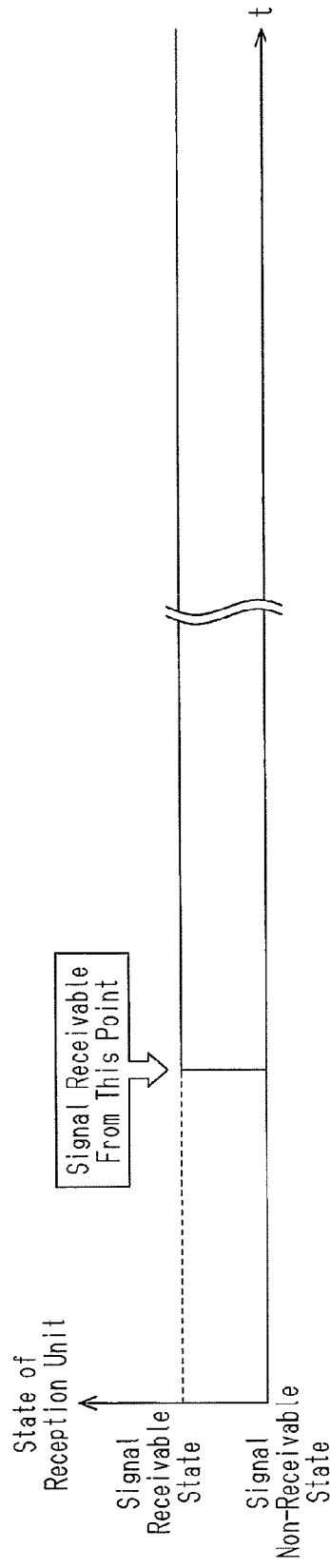
FIG. 13B is a timing chart illustrating a period during which a reception unit can receive data.

Referring to FIG. 12, an electronic key 60 is an example of a transmitter device. The electronic key 60, which is carried by the user of a vehicle, includes a key control unit 61, a transmission unit 12, a transmission antenna 12a, an unlocking switch 62, and a locking switch 63.

The key control unit 61 has the same structure as the transmitter device controller 11 of the above embodiments. The key control unit 61 includes a memory 61a, which stores an ID code unique to the electronic key 60. The transmission unit 12 and the transmission antenna 12a have the same structure as the corresponding components described in the first embodiment. An in-vehicle device 20 has the same structure that described in the above embodiments.

The unlocking switch 62 and the locking switch 63 each provide a corresponding operation signal to the key control unit 61 when operated. When determining that the unlocking switch 62 has been operated, the key control unit 61 transmits through wireless communication an unlocking request signal having a frequency in the UHF range with the transmission unit 12 and the transmission antenna 12a. When determining that the locking switch 63 has been operated, the key control unit 61 transmits through wireless communication a locking request signal having a frequency in the UHF range with the transmission unit 12 and the transmission antenna 12a. Each of the request signals includes a plurality of identical frames. Each frame includes an ID code and the like. Further, each frame is marked using one of the methods described in the above embodiments and divided into first to third frame segments 51 to 53.

The reception unit 22 demodulates the unlocking request signal or the locking request signal received with the reception antenna 22a and provides the demodulated request signal to the receiver device controller 21. When the ID code in a frame of the unlocking request signal conforms to an ID code stored in the memory 21a, the receiver device controller 21 unlocks the vehicle doors. When the ID code in a frame of the locking request signal conforms to the ID code stored in the memory 21a, the receiver device controller 21 locks the vehicle doors. In this process, the receiver device controller 21 (more precisely, the frame reconstruction unit 30) identifies the first to third frame segments 51 to 53 based on the counted number of bits from the preamble or a marking area MA in the same manner as in the above embodiments.

From the viewpoint of reduction in power consumption, the receiver device controller 21 permits the reception unit 22 to receive signals in predetermined cycles. In other words, the reception unit 22 cannot constantly receive signals. Referring to FIGS. 13A and 13B, the reception unit 22 may be switched to a state in which signals are receivable in the middle of a frame. For example, the reception unit 22 may be switched to a signal receivable state in the middle of the second frame segment 52. In this case, the reception unit 22 deletes the second frame segment 52, which has been received from the middle, and temporarily stores the third frame segment 53, which has been normally received, in the memory 21a. The third frame segment 53 is identified based on the number of bits between marking areas MA as described above. When receiving the first frame segment 51 and the second frame segment 52 in a second frame, the reception unit 22 combines the received frame segments 51 and 52 with the third frame segment 53, which was previously received and stored in the memory 21a, to reconstruct a frame. Accordingly, the receiver device identifies a complete frame more promptly even when the reception of a signal is started in the middle of a frame. In the example of FIGS. 13A and 13B, the third frame segment 53, which has been received normally, corresponds to a latter part of a specific frame. In the example shown in FIGS. 13A and 13B, the frame from which the reception unit 22 started to receive at the middle corresponds to the specific frame. The third frame segment 53 of the specific frame corresponds to the latter part of the specific frame. The first and second frame segments 51 and 52 included in the subsequent frame correspond to a former part.

In the fifth embodiment, when a frame includes a bit error in a frame segment, the receiver device can reconstruct a complete frame by combining frame segments obtained from a plurality of frames as illustrated in FIG. 5.

The fifth embodiment has the following advantage in addition to the advantages of the first embodiment.

(6) When the receiver device is switched to a signal receivable state from the middle of a frame, the receiver device reconstructs a complete frame by combining the frame segment 53, which has been normally received, with the frame segments 51 and 52 in the subsequently received frame.

It should be apparent to those skilled in the art that the present invention may be embodied in many other specific forms without departing from the spirit or scope of the invention. Particularly, it should be understood that the present invention may be embodied in the following forms, which may also be combined.

In the first embodiment, the fixed period T is set to the time required to transmit ½₀ to ½ of a bit. However, the fixed period T is not be limited to this range. For example, the fixed period T may be set to, for example, the time required to transmit a single bit.

In the above embodiments, the number of bits between two marking areas MA is counted. Alternatively, the time between two marking areas MA may be measured.

The marking may be performed using a combination of the marking methods of the above embodiments.

Although the FSK modulation is used in the fourth embodiment, modulation is not limited to this process. For example, amplitude shift keying (ASK) or phase shift keying (PSK) modulation may be performed. Any digital communication process other than these modulation processes may also be used.

In the fourth embodiment, the frame is marked by inserting three consecutive H level chips. Alternatively, the frame may be marked by inserting three consecutive L level chips. The L level pulse for three consecutive chips is not generated by Manchester encoding for the reason described in the fourth embodiment.

Figure 14:
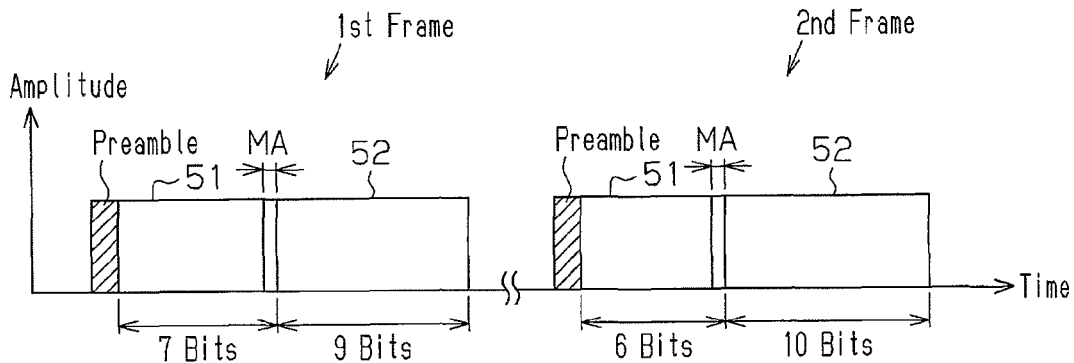
FIG. 14 is a timing chart showing the format of a frame in a modification.

In the above embodiments, the positions of the marked bits are the same. However, the positions of the marked bits may be shifted for each frame. In FIG. 14, a first frame includes a first frame segment 51 with seven bits and a second frame segment 52 with nine bits. A second frame includes a first frame segment 51 with six bits and a second frame segment 52 with ten bits. In this example, whenever a frame is transmitted, the number of bits in the first frame segment 51 is decremented by one until reaching a predetermined value and the number of bits in the second frame segment 52 is incremented by one until reaching a predetermined value. In this manner, the position of the marked bit is not limited to that of the above embodiments as long as the sensor unit 10 and the in-vehicle device 20 both use the same marking rule, that is, the rule for setting the number of bits in the frame segments of each frame. The receiver device can identify different frame segments of different frames by counting the number of bits in each frame segment.

In the example shown in FIG. 14, a frame constructed by combining frame segments has a missing bit. For example, when the second frame segment 52 (nine bits) of a first frame is combined with the first frame segment 51 (six bits) of a second frame, the completed frame would include 15 bits. In this case, one bit would be lacking because a full frame should include 16 bits. To solve this problem, the in-vehicle device 20 adjusts the length of each frame segment so that each frame segment has the same number of bits.

Figure 15A:
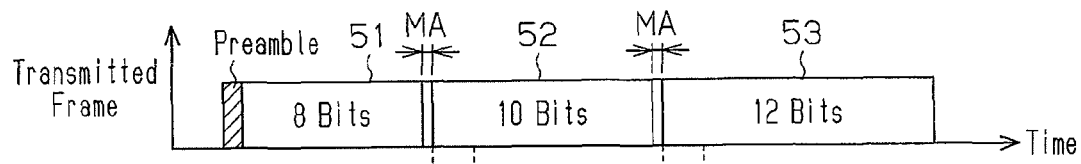
FIG. 15A shows a frame in another modification.
Figure 15B:
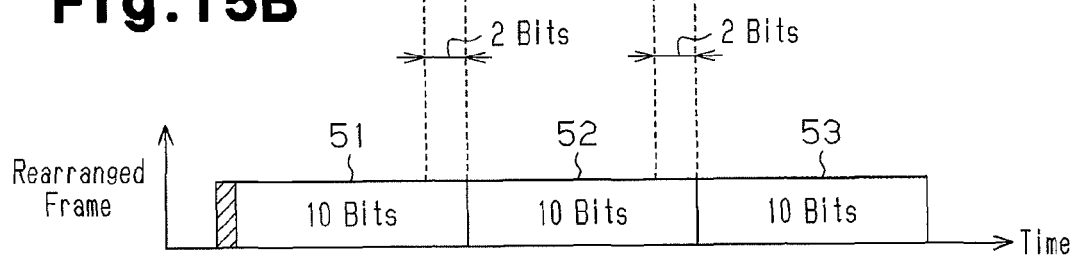
FIG. 15B shows a frame including frame segments of which lengths have been adjusted.

For example, as shown in FIG. 15A, the transmitted frame may include a first frame segment 51 having 8 bits, a second frame segment 52 having 10 bits, and a third frame segment 53 having 12 bits. The receiver device controller 21 can identify the first to third frame segments 51 to 53 based on the counted number of bits from the preamble or a marking area MA. After identifying each frame segment, the receiver device controller 21 adjusts the length of the frame segment to 10 bits as shown in FIG. 15B. The receiver device controller 21 incorporates the first bit and the second bit of the second frame segment 52 into the first frame segment 51 and uses these bits as a ninth bit and tenth bit of the first frame segment 51. Further, the receiver device controller 21 incorporates the first bit and the second bit of the third frame segment 53 into the second frame segment 52 and uses these bits as a ninth bit and tenth bit of the second frame segment 52. After adjusting the length of each frame segment to 10 bits, the receiver device controller 21 combines the adjusted frame segments in the repeatedly received frames and reconstructs a complete frame that does not have any missing bits. This structure is effective when, for example, the receiver device starts receiving a signal in the middle of a frame. Although each frame segment is adjusted to 10 bits in the present example, each frame segment does not necessarily have to be adjusted to 10 bits. For instance, the frame segments 51, 52, and 53 may be adjusted to have different lengths (e.g., n bits, n+1 bits, and n+2 bits) as in the above embodiments.

In the above embodiments, each of the frame segments 51 to 53 includes an error detection bit Be as shown in FIG. 3. The error detection bit Be allows for identification of the ones of the frame segments 51 to 53 including a bit error. Alternatively, an error detection bit may be added to each frame. In this case, the receiver device cannot identify which one of the frame segments 51 to 53 includes a bit error. Thus, the receiver device combines all of the frame segments 51 to 53 to reconstruct a plurality of frames. Then, the receiver device checks for errors in the reconstructed frames using the error detection bit. This reduces the number of bits used as error correcting bits in each frame and thereby shortens the length of each frame.

The communication system of each of the above embodiments is a wireless communication system in which frames are transmitted and received through wireless communication. Alternatively, the communication system may be a wired communication system in which frames are transmitted and received through wires. In this case, the frames form, for example, an optical signal or an electric signal.

In the fourth embodiment, the combination of bits that is not used for communication is three H level consecutive chips. However, the combination of bits is not limited in such a manner as long as the combination is not used for communication.

In the above embodiments, each frame is divided into three parts, namely, the first to third frame segments 51 to 53. Alternatively, each frame may be divided into any other number of parts. The number of times the frame is marked is determined by the number of parts into which the frame is divided.

Figure 16:
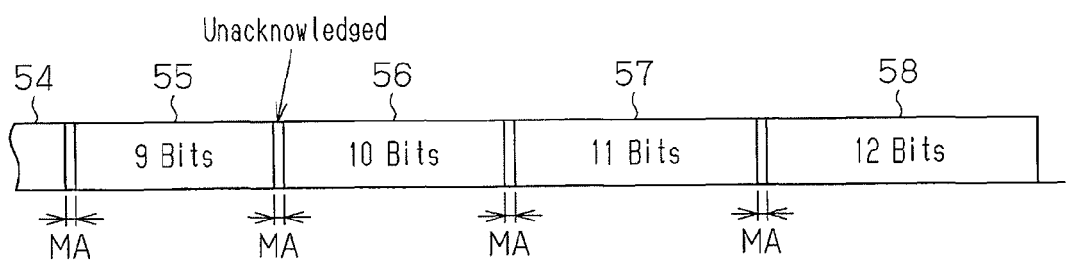
FIG. 16 shows a frame in still another modification.

When a frame includes, for example, eight frame segments, the processing performed when some of the markings cannot be acknowledged will now be described. In this example, the methods described in the first to third embodiments are used to form markings. Further, an error detection bit is added to each frame (specifically, to the end of each frame). As shown in FIG. 16, the frame reconstruction unit 30 identifies the frame segments 51 to 58 based on the number of bits between the marking areas MA. When the counted number of bits from the preamble or a marking area MA exceeds the number of bits of the longest frame segment (12 bits in the present example), the frame reconstruction unit 30 determines the marking area MA could not be acknowledged. When, for example, the counted number of bits is 19 bits, the frame reconstruction unit 30 determines that the marking area MA between the fifth frame segment 55 and the sixth frame segment 56 could not be acknowledged. In this case, when determining that the frame has no bit error with the error detection bit added to each frame, the frame reconstruction unit 30 uses the frame as the frame transmitted from the transmitter device. Further, the frame reconstruction unit 30 may handle the fifth frame segment 55 and the sixth frame segment 56 as a single frame segment and reconstruct the frame by combining the frame segments with a frame segment of another frame. Alternatively, the frame reconstruction unit 30 may reconstruct the frame by automatically adding a marking where it should have been recognized.

The present examples and embodiments are to be considered as illustrative and not restrictive, and the invention is not to be limited to the details given herein, but may be modified within the scope and equivalence of the appended claims.

The invention claimed is:

1. A transmitter device that repeatedly transmits an identical frame a plurality of times, the transmitter device comprising:
   a circuitry that generates the frame and transmits the frame a plurality of times, wherein
   the frame includes a marking area that divides the frame into a plurality of frame segments having different lengths,
   the marking area is formed in the frame by part of the frame and is distinguishable from other parts of the frame,
   the marking area does not change data content transmitted by the frame, and
   the frame segments obtained from the identical frame that is repeatedly transmitted by the circuitry are combined to reconstruct a complete frame identical to the frame transmitted by the transmitter device.

2. The transmitter device according to claim 1, wherein
   the circuitry transmits the frame with a radio wave, and
   the circuitry suspends the radio wave for a fixed period during transmission of the frame to form the marking area.

3. The transmitter device according to claim 1, wherein
   the circuitry modulates a frequency of a carrier wave to form the marking area, and
   the carrier wave includes a first frequency and a second frequency, each corresponding to a part of the frame excluding the marking area, and a third frequency, corresponding to the marking area and differing from the first and second frequencies.

4. The transmitter device according to claim 1, wherein
   the circuitry forms shifts a phase of a carrier wave to form the marking area in the frame, and
   the carrier wave includes a first phase, which corresponds to a part of the frame excluding the marking area, and a second phase, which corresponds to the marking area and is shifted from the first phase.

5. The transmitter device according to claim 1, wherein
   the frame includes an encoded bit generated by a predetermined encoding process, and the circuitry includes in the frame a bit sequence that is not generated by the predetermined encoding process to form the marking area.

6. The transmitter device according to claim 5, wherein the predetermined process is Manchester encoding, and the bit sequence is a part in which the same signal level continues for a period corresponding to at least 1.5 bits.

7. A communication system comprising:
the transmitter device according to claim 1; and
a receiver device that functions in a signal receivable state in which a frame can be received, wherein
the receiver device intermittently enters the signal receivable state, and
the receiver device includes a circuitry that reconstructs a complete frame identical to the frame transmitted from the transmitter device,
when the receiver device enters the signal receivable state from the middle of a certain frame, the receiver device combines a frame segment in a latter part of the received certain frame with a frame segment in a former part of a frame following the certain frame to reconstruct the complete frame identical to the frame.

8. A communication system comprising:
the transmitter device according to claim 1; and
a receiver device that receives a frame, wherein
the circuitry of the transmitter device includes an error detection bit in each frame segment when transmitting the frame segment, and
the receiver device includes a circuitry that detects, with the error detection bit included in the frame segment, whether each of the frame segments includes a bit error, and
the circuitry of the receiver device combines ones of the frame segments that are free of a bit error from the frames repeatedly transmitted by the transmitter device to reconstruct a complete frame identical to the frame transmitted from the transmitter device.

9. A communication system comprising:
the transmitter device according to claim 1; and
a receiver device that receives the frame, wherein
the circuitry of the transmitter device includes an error detection bit in the frame of each transmission, and
the receiver device includes a circuitry that receives the transmissions of the frame, combines a plurality of frame segments included in the transmissions of the frame to reconstruct a plurality of frames, detects, with the error detection bit included in the frame of each transmission, whether the frame of each transmission includes a bit error, and uses the transmissions of the frame having no bit error as a complete frame identical to the frame that is transmitted from the transmitter device.

10. A receiver device comprising:
a reception unit that repeatedly receives a frame a plurality of times, wherein the frame includes marking areas that divide the frame into a plurality of frame segments having different lengths; and
a circuitry that detects the marking area from the received frame, identifies the plurality of frame segments based on an interval of the detected marking areas, and combines a plurality of normally received frame segments in the repeatedly received frames to reconstruct a complete frame identical to the frame transmitted by the transmitter device.

11. The receiver device according to claim 10, wherein
the receiver device suspends a radio wave for a fixed period during transmission of the frame to form the marking areas in the frame, and
the circuitry of the receiver device detects a signal strength during reception of the frame and acknowledges parts of the frame where the signal strength drastically decreases as the marking areas.

12. The receiver device according to claim 10, wherein
the receiver device is for use with a transmitter device that modulates a frequency of a carrier wave to form the marking areas in the frame,
the carrier wave includes a first frequency and a second frequency, each corresponding to parts of the frame excluding the marking areas, and a third frequency, corresponding to the marking areas and differing from the first and second frequencies, and
the circuitry of the receiver device detects the third frequency during reception of the frame and acknowledges parts of the frame corresponding to the third frequency as the marking areas.

13. The receiver device according to claim 10, wherein
the receiver device is for use with a transmitter device that shifts a phase of a carrier wave to form the marking areas in the frame,
the carrier wave includes a first phase, which corresponds to a part of the frame excluding the marking area, and a second phase, which corresponds to the marking areas and is shifted from the first phase, and
the circuitry of the receiver device detects the second phase during reception of the frame and acknowledges parts of the frame corresponding to the second phase as the marking areas.

14. The receiver device according to claim 10, wherein
the receiver device is for use with a transmitter device that includes bit sequences that are not generated by a predetermined encoding process in the frame to form the marking areas, and
the circuitry of the receiver device detects the bit sequences in the received frame and acknowledges the bit sequences as the marking areas.

15. The receiver device according to claim 10, wherein
the circuitry of the receiver device detects, with an error detection bit included in the frame, whether the frame includes a bit error, and
when the marking areas cannot be acknowledged but the frame is free of a bit error, the circuitry of the receiver device uses the frame that is free of a bit error as a complete frame identical to the frame transmitted from the transmitter device.

16. A communication system comprising:
a transmitter device for repeatedly transmitting an identical frame a plurality of times; and
a receiver device receiving the frame transmitted from the transmitter, wherein
the transmitter device includes a circuitry that transmits the frame, the frame includes marking areas that divide the frame into a plurality of frame segments having different lengths, the marking areas are formed in the frame by parts of the frame and are distinguishable from other parts of the frame, and the marking areas do not change a data content transmitted by the frame, and
the plurality of transmissions of the identical frame includes transmission of a first frame received by the receiver device and a second frame received by the receiver device after the first frame, and the receiver device identifies a plurality of frame segments in each of the first and second frames based on an interval between the marking areas, stores a frame segments in the first frame that is received normally, and combines a frame segment in the second frame that corresponds to a frame segment that has not been received normally in the first frame with the stored frame segment to reconstruct a complete frame identical to the frame transmitted from the transmitter device.

17. The communication system according to claim 16, wherein the interval between the marking areas is a number of counted bits from a preamble or a marking area in the frame.

\* \* \* \* \*

UNITED STATES PATENT AND TRADEMARK OFFICE
CERTIFICATE OF CORRECTION

| | | |
|---|---|---|
| PATENT NO. | : 8,654,818 B2 | Page 1 of 1 |
| APPLICATION NO. | : 13/416587 | |
| DATED | : February 18, 2014 | |
| INVENTOR(S) | : Kosugi | |

It is certified that error appears in the above-identified patent and that said Letters Patent is hereby corrected as shown below:

In the Claims

Column 17, line 4, claim 16, please delete "segments in" and insert -- segment in --

Signed and Sealed this
Sixteenth Day of September, 2014

Michelle K. Lee
*Deputy Director of the United States Patent and Trademark Office*